United States Patent [19]

Nasr et al.

[11] Patent Number: 5,018,215

[45] Date of Patent: May 21, 1991

[54] KNOWLEDGE AND MODEL BASED ADAPTIVE SIGNAL PROCESSOR

[75] Inventors: Hatem N. Nasr, Edina; Firooz A. Sadjadi, St. Anthony; Michael E. Bazakos, Bloomington; Hossien Amehdi, Edina, all of Minn.

[73] Assignee: Honeywell Inc., Minneapolis, Minn.

[21] Appl. No.: 498,196

[22] Filed: Mar. 23, 1990

[51] Int. Cl.$^5$ .............................................. G06K 9/62
[52] U.S. Cl. ............................................. 382/15; 382/1; 382/14; 364/513; 364/516; 358/125
[58] Field of Search ............... 382/1, 14, 15; 355/125, 355/126; 364/516; 342/64

[56] References Cited

U.S. PATENT DOCUMENTS

| | | | |
|---|---|---|---|
| 4,071,744 | 1/1978 | Pollock | 364/105 |
| 4,625,240 | 11/1986 | Yablonski | 358/174 |
| 4,704,695 | 11/1987 | Kimur et al. | 382/15 |
| 4,739,401 | 4/1988 | Sacks et al. | 382/15 |
| 4,796,187 | 1/1989 | North | 264/423 |
| 4,825,055 | 4/1989 | Pollock | 235/411 |

Primary Examiner—Leo H. Boudreau
Assistant Examiner—Steven P. Fallon
Attorney, Agent, or Firm—John G. Shudy, Jr.

[57] ABSTRACT

A knowledge and model based adaptive signal processor for ensuring optimum performance in automated object recognition (AOR) systems. The invention does not require ground-truth information but uses predictive performance models for parameter adaption and updates for the AOR. The performance models are representations of continuous surfaces that interpolate and extrapolate for data and scenarios not previously tested. The present invention increases probability of detection and decreases false detection alarm rates of AOR systems.

12 Claims, 12 Drawing Sheets

AOR Segmentation

| Frame | Object | Without KMBASP | With KMBASP |
|---|---|---|---|
| 1 | 3 | 0.8030303 | 0.883333 |
| 2 | 1 | 0.7627119 | 0.8653846 |
| 2 | 2 | 0.6470588 | 0.9041096 |
| 2 | 3 | 0.654321 | 0.9298246 |

KNOWLEDGE AND MODEL BASED ADAPTIVE SIGNAL PROCESSOR

FIELD OF THE INVENTION

The invention pertains to signal and image processing systems, automatic object recognition systems (AOR's), and particularly, to systems that accommodate AOR systems for optimizing AOR performance.

BACKGROUND OF THE INVENTION

In many missions, the AOR is confronted with scenes having high-density clutter. This clutter is caused by many objects that look like targets. This ultimately causes high false alarm rates. Reducing these rates requires tuning a number of AOR parameters.

A critical problem in AOR systems is multi-scenario adaptation. Present AOR systems perform well in certain scenarios, but they perform poorly and unpredictably in others. Unless AOR systems can be adapted, their utility in battlefield missions remains questionable.

Object contrast may vary quickly due to dust, atmospheric and sensor perturbations, image formation and phenomenological reasons. Such variation can cause the AOR to miss or breakup the object. Adjusting the bright thresholds, among other parameters, can compensate for contrast variations.

Multi-scenario adaptability is the most serious and challenging problem in AOR technology. AOR adaptation is not just a desirable feature but rather a very critical functional requirement.

The problem of multi-scenario adaptation was formerly realized in the AOR technology. It was understood art that algorithms would perform well with whatever assumptions they were based upon, and that they would detect and recognize objects similar to the ones they were trained on. However, it was also assumed that the algorithms were flexible enough to span a wide range of scenarios. This assumption proved to be wrong when AORs were tested in the field. Real world scenarios and terrain boards showed that there was too much variation in the content, context and quality of the images, and that the AORs were designed to deal with only a small subset of them.

One promising aspect in solving the adaptation problem was that most AOR systems are parameterized. Tests showed that tuning a number of algorithm parameters improved AOR performance. In many tests, the improvement was dramatic. Manually-performed parameter adaptation was used for tuning the parameters. Such parameter adaptation required a human expert because it required intimate knowledge of the AOR algorithms and its many parameters.

As a result, the AOR adaptation challenge was focused on automatic adaptation of parameters. Adaptation came to mean tuning AOR parameters based on observation of the scene and not on AOR internal processing results, such as adaptive thresholding and background adaptation. A number of approaches were conceived to deal with this problem, but none appeared satisfactory to the present applicants.

SUMMARY OF THE INVENTION

The invention is a knowledge and model based adaptive signal processor (KMBASP). The invention automatically adapts the AOR parameters as the scenario changes so that AOR can maintain optimum performance. The KMBASP adapts AOR parameters based on scene/image/signal measurements and uses formal performance prediction models. This approach results in effective on-line automated AOR parameter adaptation for multi-scenario adaptation, eliminates the stringent requirement for ground-truth information in order to compute the AOR performance, and uses formal performance prediction models that allow the AOR to perform well with untested scenarios.

The present invention demonstrated AOR improvements in three critical performance measures—such as probability of detection, false alarm rate and segmentation accuracy. The KMBASP approach to AOR adaptation is based on parameter adaptation using performance predictive models, knowledge-based techniques and performance optimization methods. The performance models are based on laboratory or field test results of the AOR.

The present invention has numerous features in contrast to the related art. The related art requires explicit knowledge about AOR performance and image ground-truth. The KMBASP only requires modeled performance about the AOR and uses estimated groundtruth and scene image measurements (metrics). The related art requires building a very large and complex knowledge-base. Knowledge acquisition is a major issue. In the invention, the knowledge acquisition task is replaced by experimental design and test results of the AOR. A set of models are generated that can be mathematically validated. The related art does not interpolate and extrapolate for scenarios not tested before and where data is not available. The invention primarily uses performance models that are a result of carefully designed experiments. The performance models are continuous surfaces that interpolate and extrapolate for data not previously tested. The related art is computationally very intensive for real-time systems applications. The KMBASP converges to a solution very rapidly. Its software is highly optimized and requires a small amount of memory.

DESCRIPTION OF THE PREFERRED EMBODIMENTS

Figure 1:
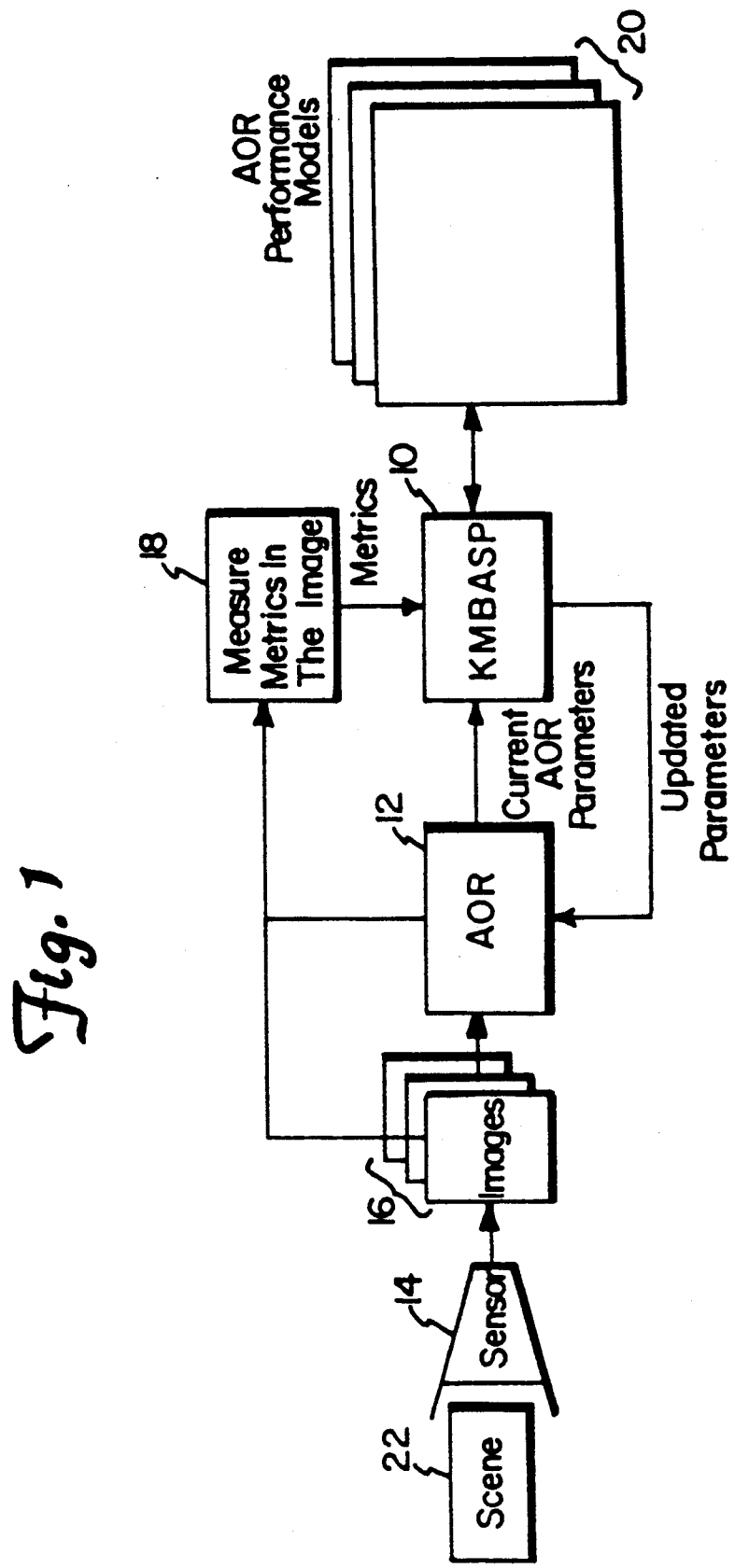
FIG. 1 is an integration of the invention with an AOR system.

FIG. 1 shows integration of KMBASP 10 with AOR system 12. Sensor 14 provides images 16 of scene 22 to AOR 12 and metric measurer 18. Measurer 18 provides metrics, which are measurements of scene/image characteristics, to KMBASP 10. AOR 12 provides current AOR parameters to KMBASP 10. KMBASP 10 uses performance models 20 and incorporates metrics from measurer 18, and determines optimal AOR parameters that optimize AOR performance based on stored models 20. In performance models 20, performance measures (such as probability of detection ($P_D$), false alarm rate (FAR) and segmentation accuracy (SA)) are a function of image/object metrics (such as range and object contrast) and parameters (such as object size and thresholds). Formulized, AOR performance measure (PM)=F ($M_1, M_2, \ldots M_m; P_1, P_2, \ldots P_n$), where $M_i$ is a metric and $P_j$ is a parameter. Given image and object metrics of the current frame to be processed and current AOR parameters, KMBASP 10 determines updated parameter values by optimizing the performance model function PM. Updated parameter values to AOR 12 constitute the tuning of the current AOR parameters.

In sum, two basic prerequisites needed to automatically tune the parameters are knowledge about the AOR performance in real-time missions, and quantitative or qualitative measures or metrics about the scene and the objects. For example, if AOR 12 is performing poorly (i.e., not detecting certain objects in the scene), given that one of the missed objects has low contrast, contrast needs to be measured. Then, after the contrast has been measured, AOR 12 may have to adjust its bright threshold by X% in order to detect the missed object. This adjustment needs to be computed. Phenomenological reasons and AOR preprocessing inconsistencies can cause significant problems in the edge extraction process, which can deteriorate object segmentation results and in turn result in erroneous classification of objects. In such case, the edge threshold in AOR 12 needs to be adjusted when the adjustment is computed. Generally, AOR 12 performance needs to be automatically measured (even though the groundtruth is not available which is the case in most missions), scene 22 and the object metrics need to be characterized and extracted, and knowledge for adapting the parameters needs to be acquired.

Figure 2:
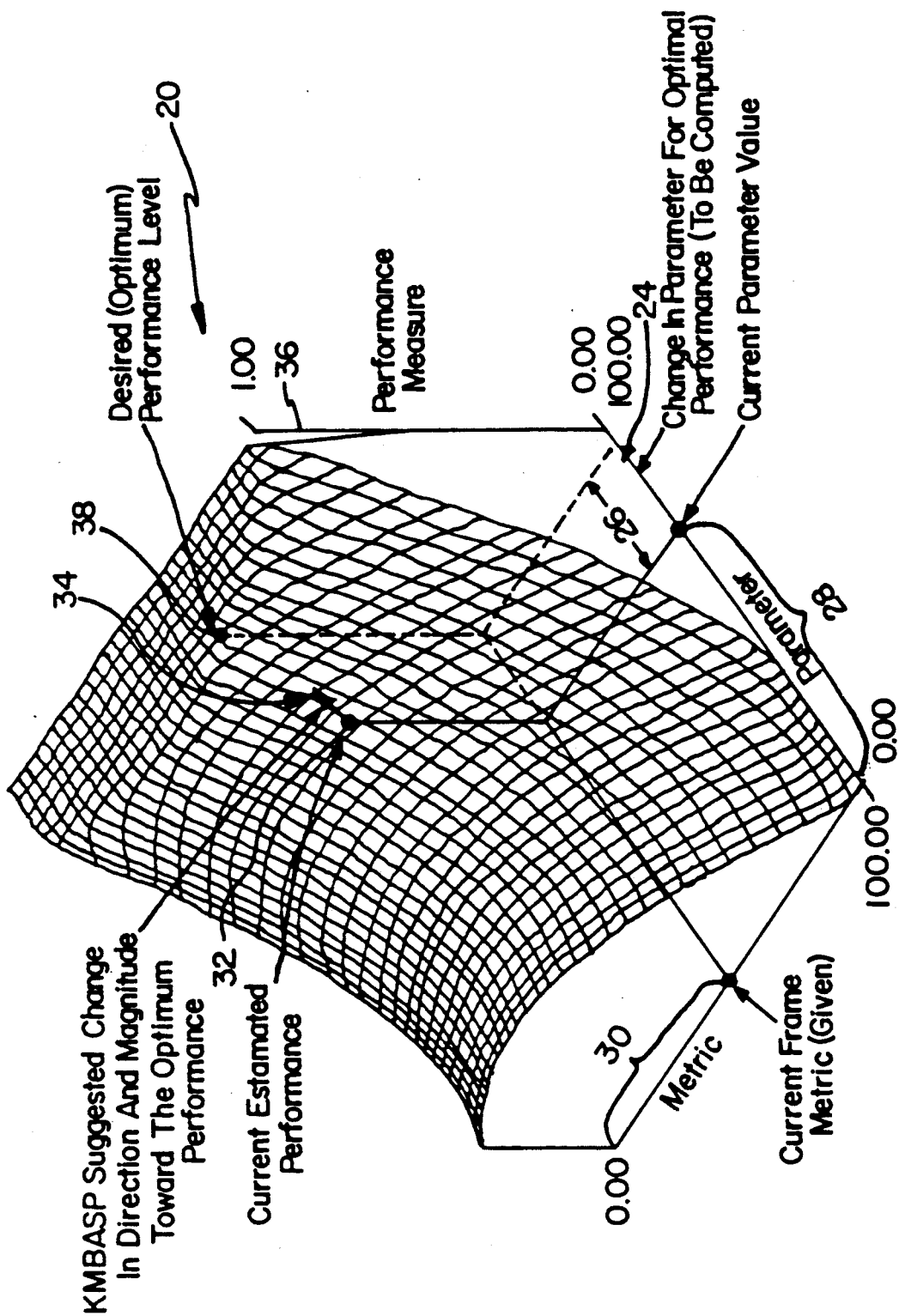
FIG. 2 is a graphical representation of an AOR performance prediction model.

The basic foundational concept of KMBASP 10 is performance model 20 which is illustrated in FIG. 2. Given AOR performance prediction model 20, whereby one or more performance measures (PM's), such as probability of detection ($P_D$), are a function of one or more image/object metrics (M's), such as range, then one or more AOR 12 system parameters (P's), such as bright threshold, can be tuned with KMBASP 10. In other words, while AOR 12 is processing incoming images 16 from sensor 14 and images 16 are being characterized in terms of metrics (M's), KMBASP 10 tunes or adjusts the parameters (P's) based on changes in image 16 metrics so that peak AOR performance is attained.

The complexity of adjusting the parameters of AOR 12 grows in orders of magnitude when performance models 20 span over three or four performance measures (i.e., ten dimensions and higher) and there are ten or more critical parameters in the system that need to be adapted or tuned. Furthermore, there is a large number of image and object metrics that AOR 12 is sensitive to. For instance, in a multi-function object acquisition processor (MTAP) system there are at least fifteen critical parameters to be adjusted for different scenarios.

Since performance models 20 are expressed in mathematical equations, finding the best change in parameters in order to achieve the optimum performance is a mathematical optimization problem. There are a number of optimization approaches, including many non-linear programming techniques, that can be used. However, these techniques tend to be computationally intensive and cannot meet the real-time requirements of AOR applications. The technique in the present invention is an optimization method that is based on taking the differential of performance models 20. This technique rapidly converges to a solution to determine the best change in parameters for achieving the optimal performance. Instead of finding the best parameter settings, the solution is reduced to finding the best change in parameters. FIG. 2 illustrates the basis of the technique. In three-dimensional model 20, parameter change 26 would be expressed as a vector 24 with a direction (toward optimum performance point 38) and magnitude (representing amount of change 26 in parameter value 28). Current frame metric 30 is a given value for the suggested change 26 computation. Point 32 shows the current estimated performance (as measured along axis 36) for metric 30 and parameter 26. The technique of the present invention determines needed change 26 parameter 28 to attain the optimal performance 38 (at a value of 1.00) and the indicated direction of vector 34.

Figure 3:
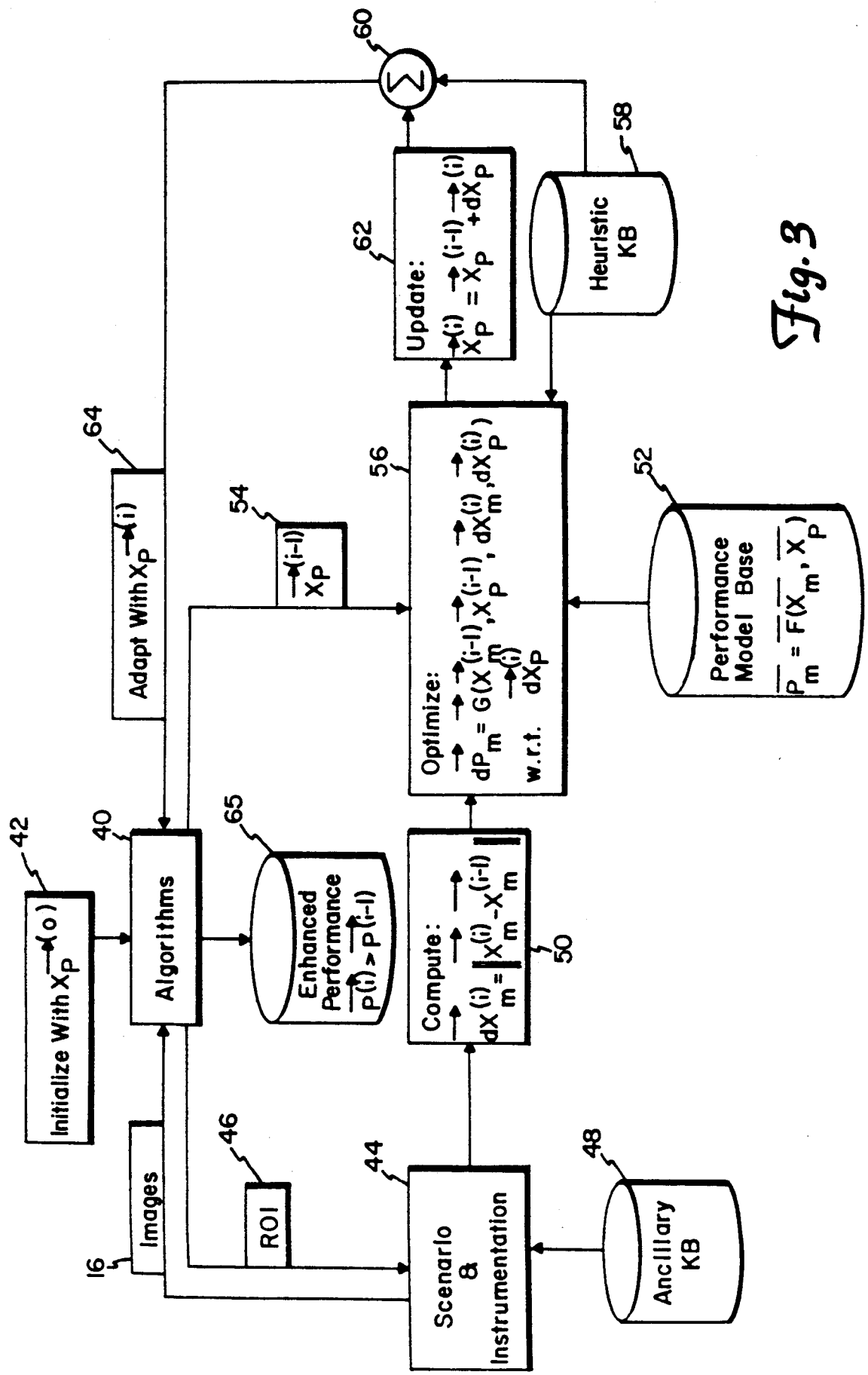
FIG. 3 reveals functional stages of the invention.

FIG. 3 is a functional diagram of the KMBASP. Unit 40 incorporates and executes the AOR suite of algorithms which include object detection, segmentation, clutter rejection and/or other algorithms. Unit 42 contains the initial set of parameters of the AOR 12. Typically, AOR algorithms are initialized with an optimum set of parameters. Images 16 go from scenario and segmentation unit 44 to algorithms unit 40 for processing. Unit 44 coordinates the input of images 16 into AOR 12, and accesses image and object and other miscellaneous information. Regions of interest (ROI's) 46 go from algorithms unit 40 to unit 44. ROI's 46 are used to extract metrics. ROI's include groundtruths which are estimated after N frames are processed. Groundtruths are estimated from archived results of detection, segmentation, clutter rejection and tracking achieved over a sequence of frames. The estimated groundtruths are used to extract image and object metrics. Ancillary knowledge base (KB) unit 48 is connected to unit 44 and contains range information, mission and sensor information, and a priori information about how many potential objects there are in the image. Unit 50 computes $dX_m$ which is the change in image and object metrics from the previous image frame to the current frame. Unit 50 is connected to unit 44. Performance model-base 52 contains a number of performance prediction models that span different performance measures, such as probability of detection ($P_D$), false alarm rate (FAR), segmentation accuracy (SA), etc. Performance measures $P_m$ are a function of the image and object metrics $X_m$ and the AOR parameters $X_p$. These models are stated as mathematical equations. $X^{p(i-1)}$ 54 comes from unit 40 and designates the AOR parameter setting in the previous frame. Optimization module 56 is connected to units 40, 50 and 52. Unit 56 uses the differential of the performance model $dP_m$ to perform its optimizing function. The differentiation of $P_m$ creates a new function G whose parameters are $X_m^{(i-1)}$, $X_p^{(i-1)}$, $dX_m^{(i)}$ and $dX_p^{(i)}$. All variables in $dP_m$ are known except $dX_p^{(i)}$ since $dX_p^{(i)}$ is the change in parameter values at the $i^{th}$ frame, which yields to the optimum performance ($P_m$). Heuristic knowledge-base (KB) 58 includes heuristic search knowledge for reducing search space and achieving rapid convergencies for obtaining optimal AOR parameters. Heuristic knowledge base 58 is connected to optimization unit and summer 60. Update unit 62 is connected to optimizing unit 56 and to summer 60. $X_p^{(i)}$ of unit 62 is the parameter setting for the current frame. $X_p^{(i)}$ is obtained by adding or subtracting the recommended parameter change $dX_p^{(i)}$ to the previous frame parameter setting $X_p^{(i-1)}$. $X_p^{(i)}$ from unit 60, which is a summation of outputs from units 58 and 62, goes to the algorithms unit 40 via connection 64. $X_p^{(i)}$ is the new updated set of parameters. In FIG. 3, $X_m^{(i)}$ means image metrics of the i th frame, $X_p^{(i)}$ means algorithm parameter values for the i th frame, $P_m$ means a performance prediction model, and $P^{(i)}$ means algorithm performance on the i th frame.

Figure 4:
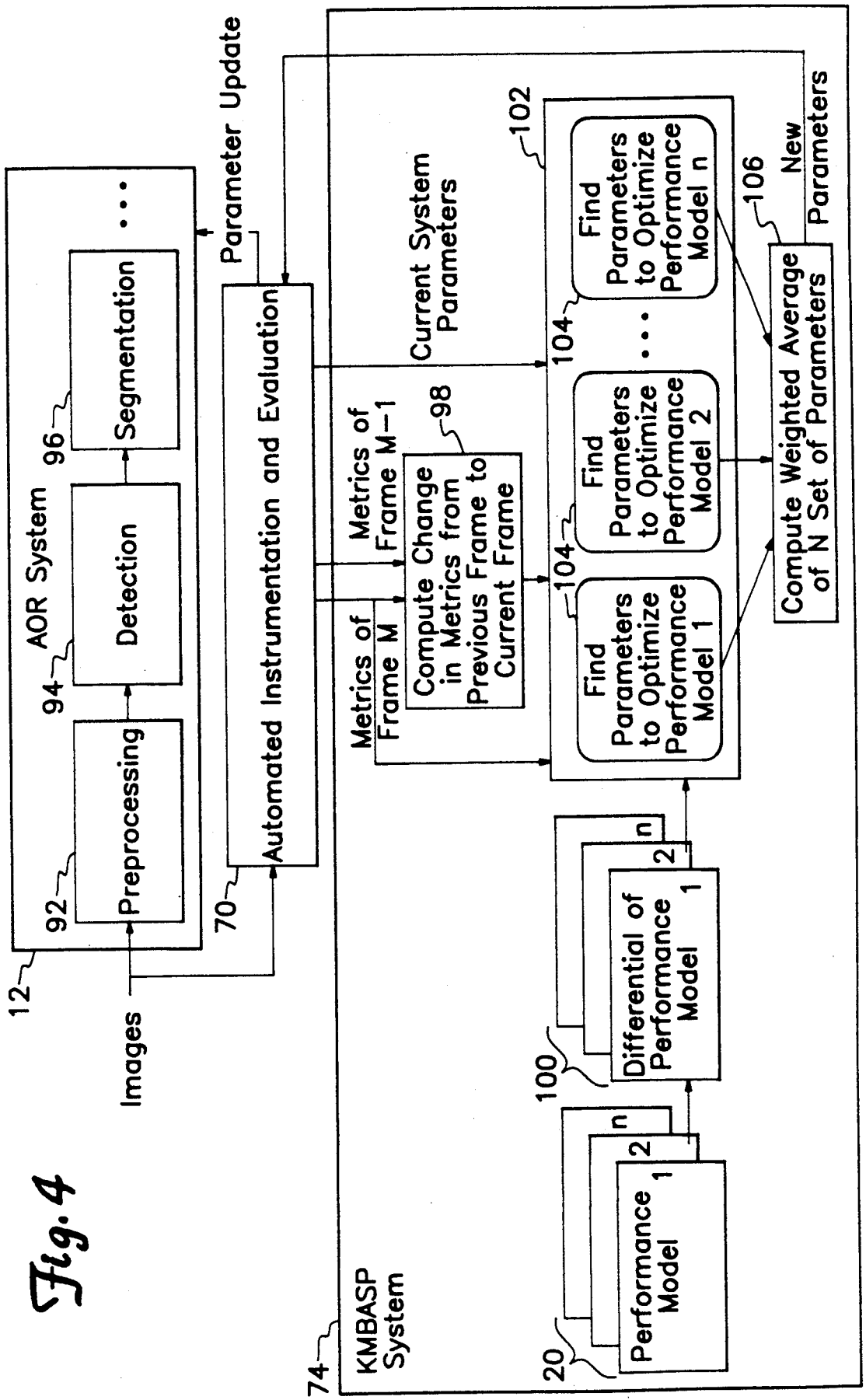
FIG. 4 is a block diagram of the invention's functions and interfaces.

FIG. 4 is a system block diagram having AOR 12, automated instrumentation and evaluation (Auto-I) 70 and KMBASP 74 interfaced together. Images enter AOR 12 to preprocessing 92, detection 94 and segmentation 96. Also, the images enter Auto-I 70. Auto-I 70 is an interface between AOR 12 and KMBASP 74. Auto-I 70 provides for extraction of image metrics for the various frames to change computer 98. Change computer 98 determines the change in metrics from the previous frame (M−1) to the current frame (M). The three categories of metrics are global (e.g., image complexity or entropy, signal to noise ratio for the image), local (e.g., object to background contrast ratio), and object (e.g., object entropy such as complexity of object shape).

Performance models 20 are differentiated to obtain performance model differentials 100 which enter performance model optimizing unit 102. Metrics of current frame M, current system parameters and the computed change in metrics from previous frame M−1 to current frame M enter optimizing unit 102. Optimizing unit 102 determines the parameters, via units 104 based on inputs to unit 102, for optimizing each performance model 20. A weighted average of the determined parameters for performance models 20 is calculated by computing unit 106. Unit 106 outputs new parameters to Auto-I 70 which in turn provides a parameter update to AOR 12.

Figure 5:
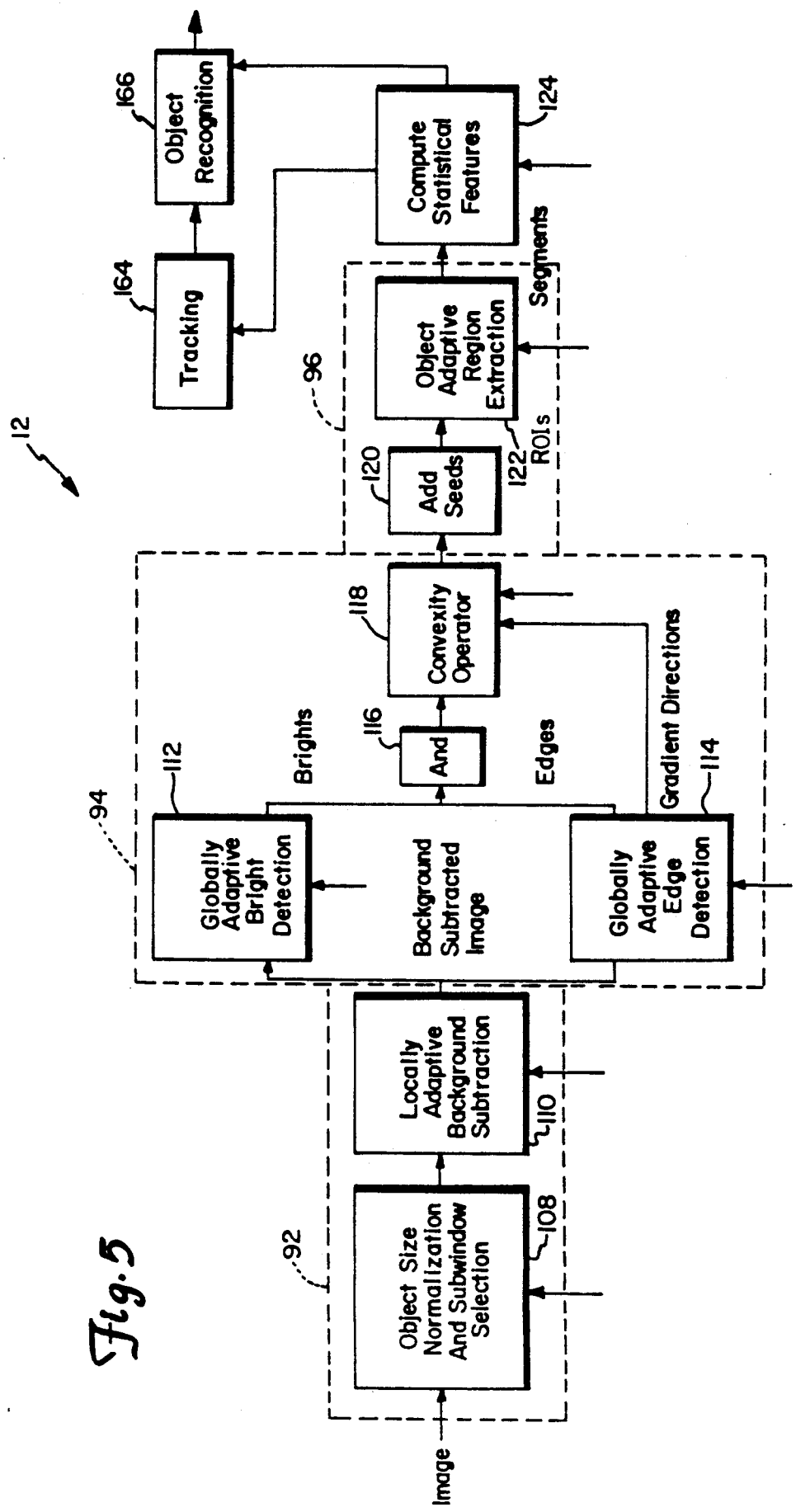
FIG. 5 is a block diagram of AOR portions significant to invention interfacing.

AOR 12, as shown in FIGS. 4 and 5, has preprocessing unit 92 that has a object size normalization and subwindow selection unit 108 which receives images and is connected to Auto-I 70. Locally adaptive background subtraction unit 110 is connected to unit 108 and Auto-I 70. Unit 110 outputs background subtracted images to globally adaptive bright detection unit 112 and globally adaptive edge detection unit 114 of detection unit 94. Units 112 and 114 are also connected to Auto-I 70. Unit 112 outputs image brights and unit 114 outputs image edges to AND unit 116. Unit 116 outputs the "ANDed" bright and edge signals to convexity operator unit 118. Unit 114 outputs gradient direction signals to unit 118. Unit 118 is connected to Auto-I 70. The output of unit 118 goes to add seeds unit 120 of segmentation unit 96. Unit 120 outputs region of interest (ROI) signals to object adaptive region extraction unit 122. Unit 120 is connected to Auto-I 70. Segments signals are outputs to compute statistical features unit 124. Outputs of unit 124 go to tracking unit 164 and object recognition unit 166. The output of tracking unit 164 goes to unit 166. Unit 166 is connected to Auto-I 70 and to any other portion of AOR 12 that may be utilized.

Figure 6:
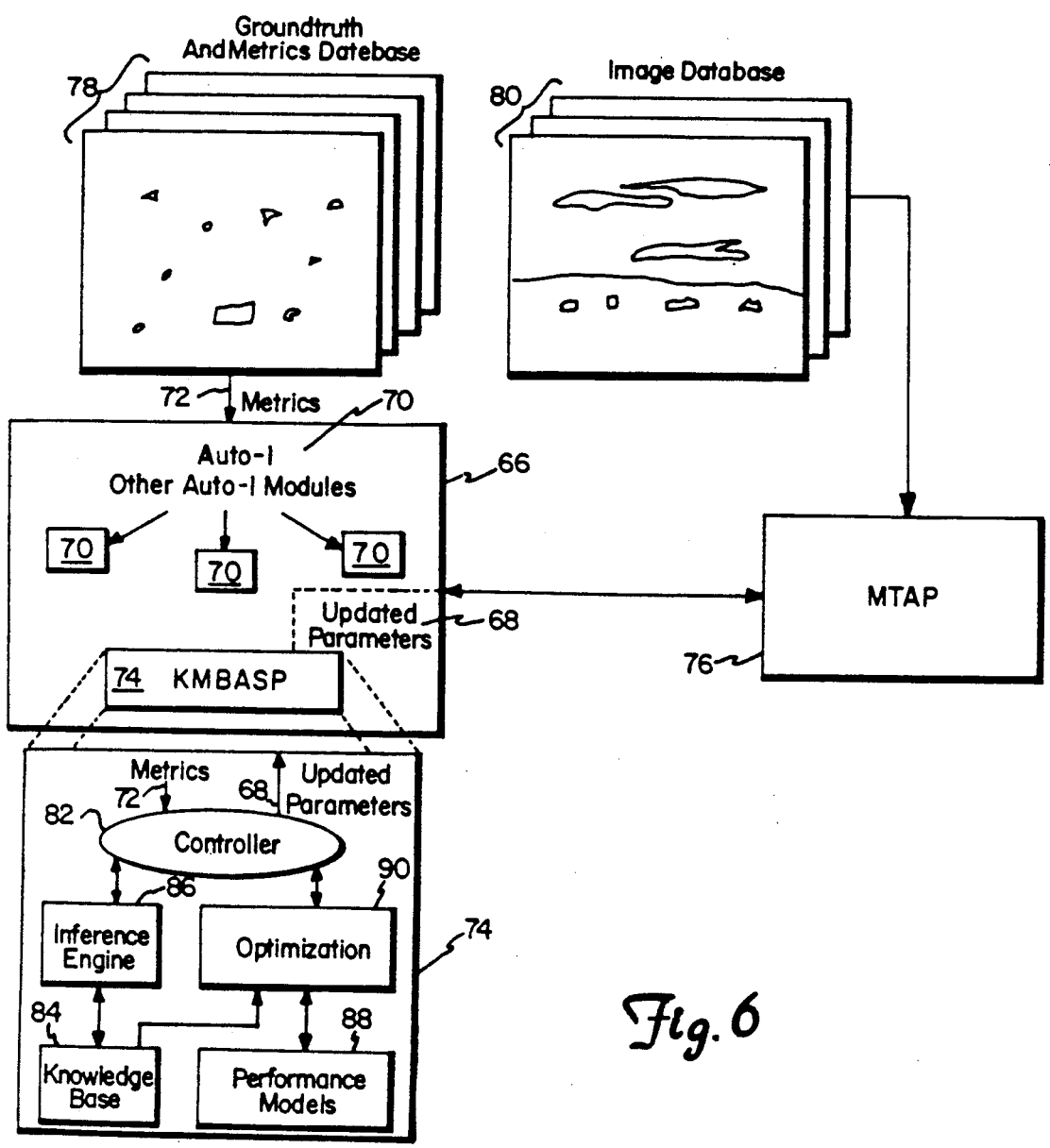
FIG. 6 illustrates the system design of the invention.

In FIG. 6, KMBASP 74 is shown to be integrated with MTAP 76 and Auto-I system 70 (hosted on a Symbolics 3670 computer). System 66 provides the needed input data and the necessary control procedures to update MTAP 76 simulation system parameters 68. Current invention testbed 74 has been integrated with MTAP simulation software running on the VAX 11/785 and International Imaging Systems (IIS) model 70.

Figure 7B:
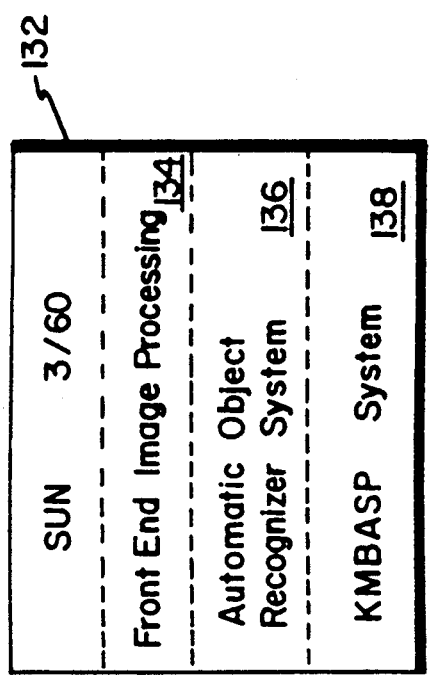
FIGS. 7a and 7b reveal overall hardware embodiments of the invention.
Figure 7A:
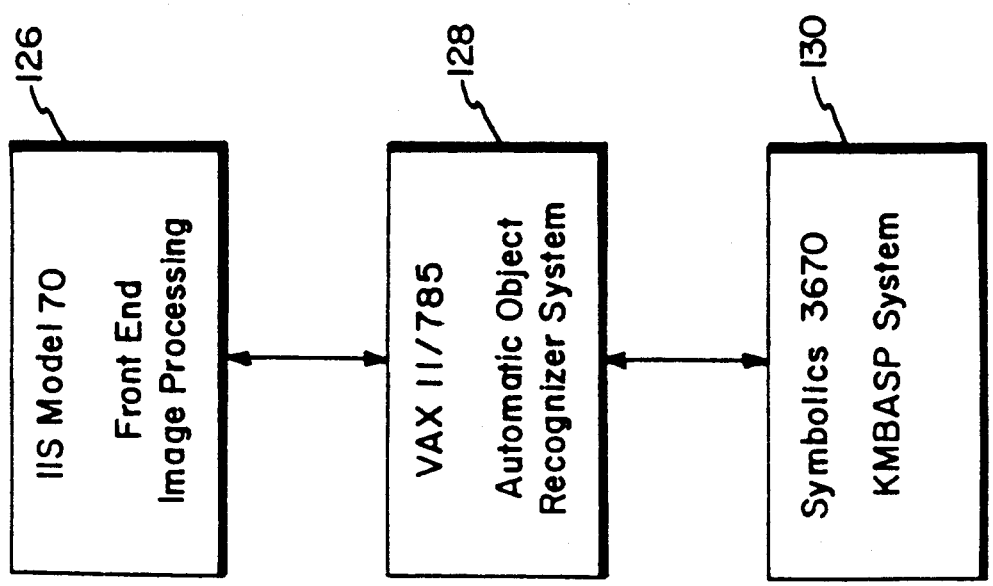

FIG. 7a illustrates the hardware configuration just noted. Front end processing unit 126 is the IIS 70 connected to AOR unit 128 which is the VAX 11/785. Unit 128 is connected to the Symbolics 3670 which incorporates KMBASP unit 130. FIG. 7b shows another hardware configuration that uses a SUN 3/60 as unit 132 that incorporates front end image processing unit 134, automatic object recognizer system 136 and KMBASP system 138.

When Auto-I 70 of FIG. 6 initiates an MTAP 76 run, an auto-adaptive mode is selected which activates invention system 74. MTAP 76 is initialized with any set of parameters 68 which are downloaded from Auto-I 70. Prior to processing each frame, Auto-I 70 fetches the corresponding image and object metrics 72 (such as object interference ratio, edge strength ratio, range, and others) which reside in database 78.

Invention implementation 74 uses precomputed metrics 72 and groundtruth images 72. Once the metrics are extracted, they are processed by invention 74. Controller 82 activates a set of rules via inference engine 86 in knowledge-base 84. One rule activates the model-base system which is tasked with optimizing, for instance, three parameters: %OVERSHOOT, MAXTRGSZ, and EDGMIN. The other rules in knowledge-base 84 are tasked with adapting three other parameters in the detection and segmentation module which includes EDGMIN, BRIGHTMIN, EDGPCT, and others. However, KMBASP 74 relies heavily on the model-base system for highly accurate parameters tuning.

The model-base system first measures the change in the scene by computing the difference between the current image metrics value and metric values of the previous frame. Auto-I 70 then provides the current AOR system parameters. As a result, KMBASP 76 performs via optimization unit 90, the optimization of the stored performance models, and outputs the new parameters 68 setting. Auto-I 70 downloads the new set of parameters to MTAP system 76, along with the parameter modifications recommended by the rule-based system. Once all the terms in the model are in place, the performance model of performance models module 88 is calculated as: $P_D = C_1 d(OVERSHOOT) + C_2 d(EDGMIN) + C_3 d(MAXTRGSZ) + C_4$. This is one equation with three unknowns: d(OVERSHOOT), d(EDGMIN), and d(MAXTRGSZ). Its solution can only be achieved through exhaustive or heuristic search. There is a set of heuristics rules that helps to achieve rapid convergence of the solutions and limit the search in the parameters space.

When KMBASP system 74 attempts to find the set of parameter values that would result in optimum performance, it computes three different sets of parameters adjustments, as illustrated below. Each parameter set is for optimizing the three different performance measures that are of interest, namely, $P_D$, FAR, and SA. A weighted average of the three sets is then computed.

The weights are assigned on the basis of the importance of the performance measures that are being optimized. In this case, probability of detection is the most important, followed equally by false alarm rate and segmentation accuracy. Below, a weighted average is computed for the final parameters adjustments.

| % OVERSHOOT = | $X_1$ | Yield | | |
|---|---|---|---|---|
| MAXTRGSZ = | $Y_1$ | | Max. PD | % OVERSHOOT$_{Final}$ = |
| EDGMIN = | $Z_1$ | | | $W_{PD}X_1 + W_{FAR}X_2 + W_{SA}X_3$ |
| % OVERSHOOT = | $X_2$ | Yield | | |
| MAXTRGSZ = | $Y_2$ | | Min. FAR | MAXTRGSZ$_{Final}$ = |
| EDGMIN = | $Z_2$ | | | $W_{PD}Y_1 + W_{FAR}Y_2 + W_{SA}Y_3$ |
| % OVERSHOOT = | $X_3$ | Yield | | |
| MAXTRGSZ = | $Y_3$ | | Max. SA | EDGMIN$_{Final}$ = |
| EDGMIN = | $Z_3$ | | | $W_{PD}Z_1 + W_{FAR}Z_2 + W_{SA}Z_3$ |

KMBASP system 74 was integrated and tested with the MTAP FORTRAN simulation system currently running on a VAX. The KMBASP software resided inside the Auto-I systems. The performance models used within the current system are specific to the MTAP algorithms. KMBASP has been tested on a number of images, with test results showing improvement in detection, reduction of false alarm, and increase in segmentation accuracy.

Figure 8A:
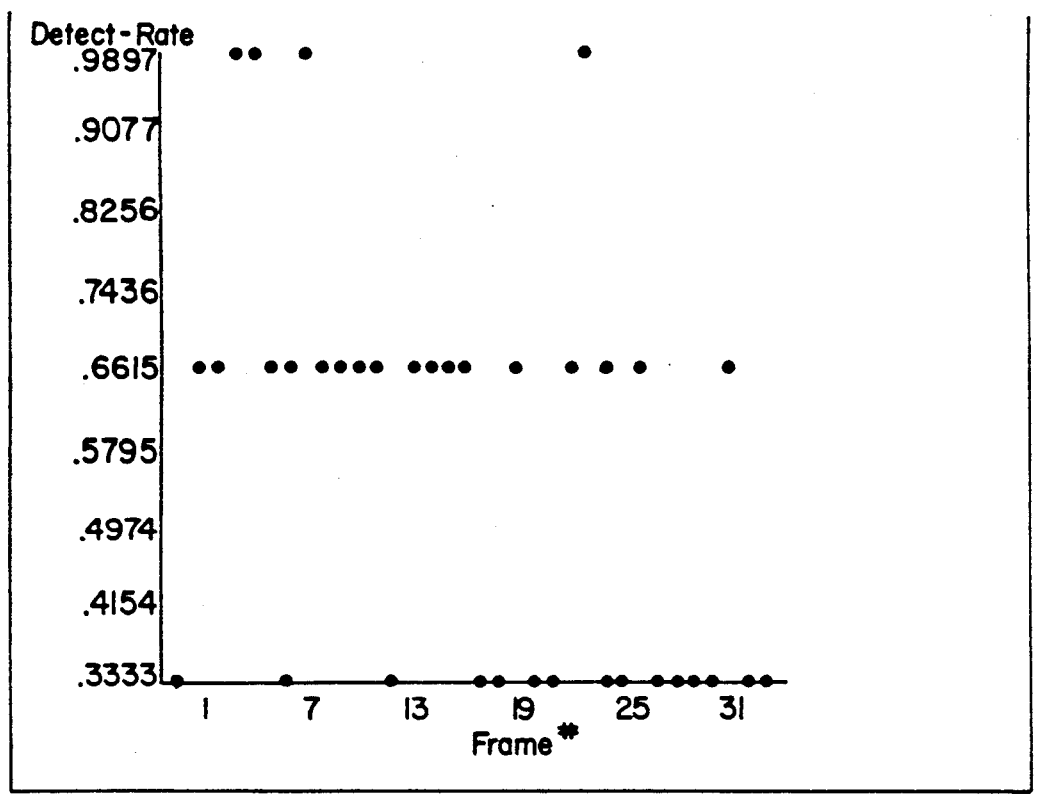
FIGS. 8a and 8b show AOR probability of detection and false alarm rates of objects, respectively, without adaption by the invention.
Figure 8B:
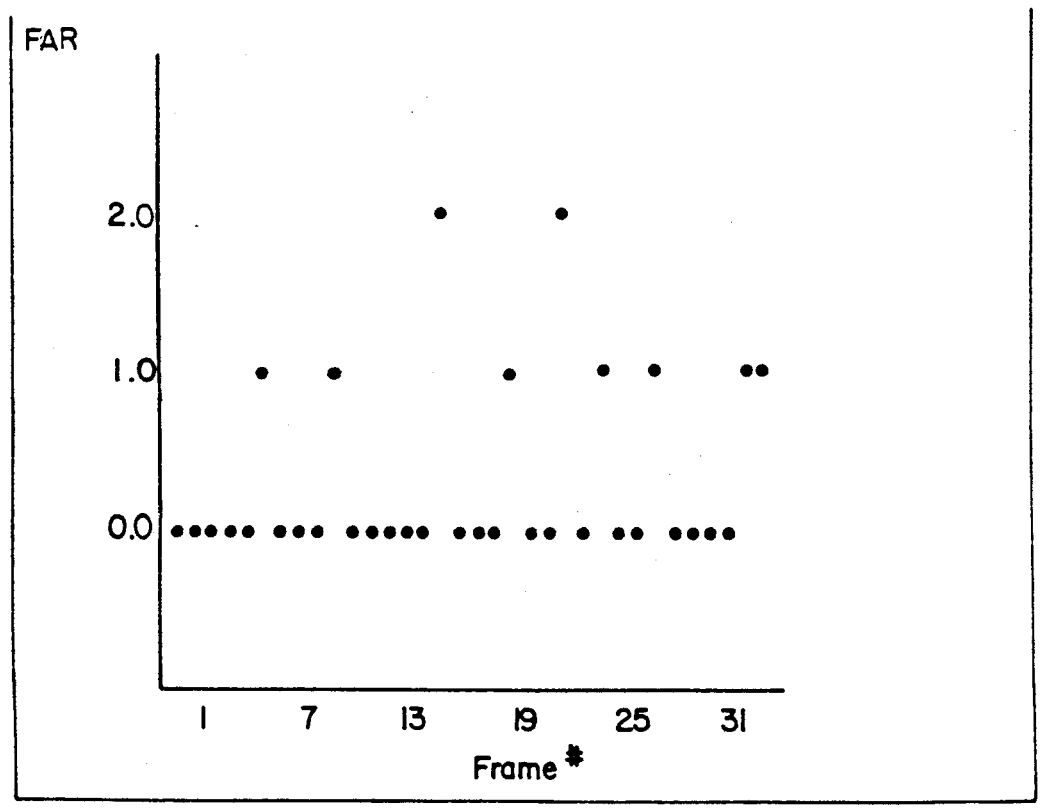

Thirty-five frames were selected from the PAIR-STECH database. There were three objects in the scene, which constituted a difficult scenario. The range was about 5 kilometers. The objects, especially the one in the left part of the image, had low contrast. The MTAP system was tested with this data set and the $P_D$, FAR, and SA performance measures were collected. In the first phase of the experiment, the MTAP algorithm was tested on the data set without adaptation of the invention. FIGS. 8a and 8b show the performance results in terms of probability of detection ($P_D$) of the object and false alarm rates (FAR), respectively, as displayed by Auto-I in this experiment. The AOR parameter selected values were a previously designated optimum set based on previous experience and tests. The performance results show that 100% detection in most frames was not achieved. One, two and sometimes three objects were often missed.

In the second part of the experiment, the same data set was run through the MTAP and the KMBASP adaptation module was activated. During processing of the first frame, no adaptation occurred. When the second frame was ready to be processed, Auto-I fetched the metrics of the incoming frame and automatically activated KMBASP system 76. The MTAP parameters were updated based on these recommendations, and the next frame processing was activated. All of these activities occurred on the Symbolics 3670 in about two seconds.

Figure 9A:
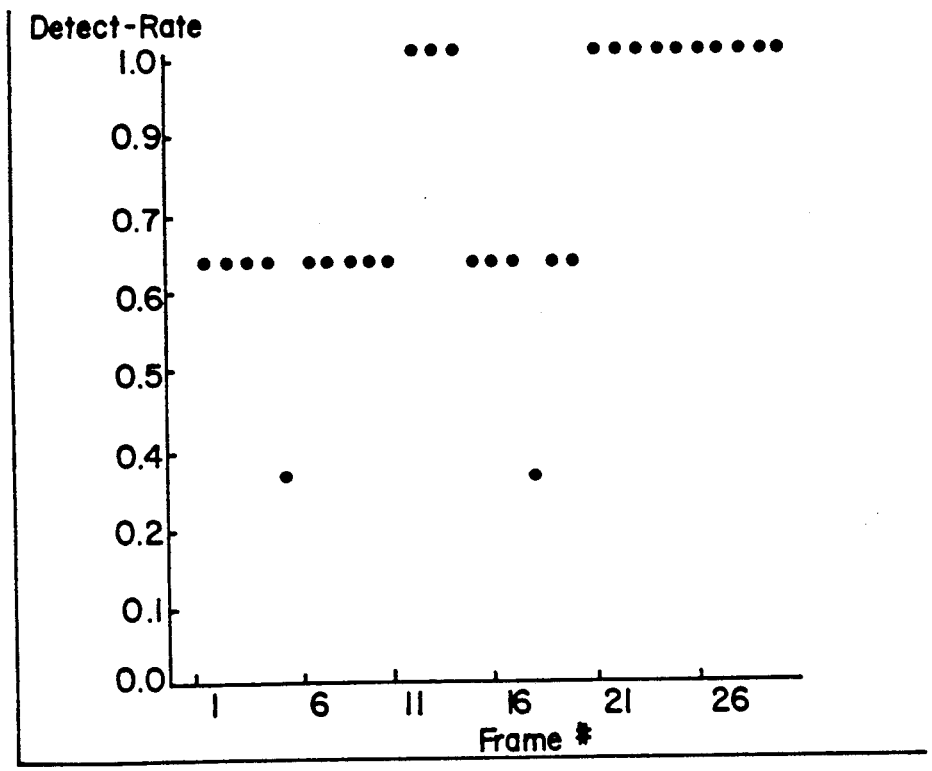
FIGS. 9a and 9b show AOR probability of detection and false alarm rates, respectively, with adaption by the invention.
Figure 9B:
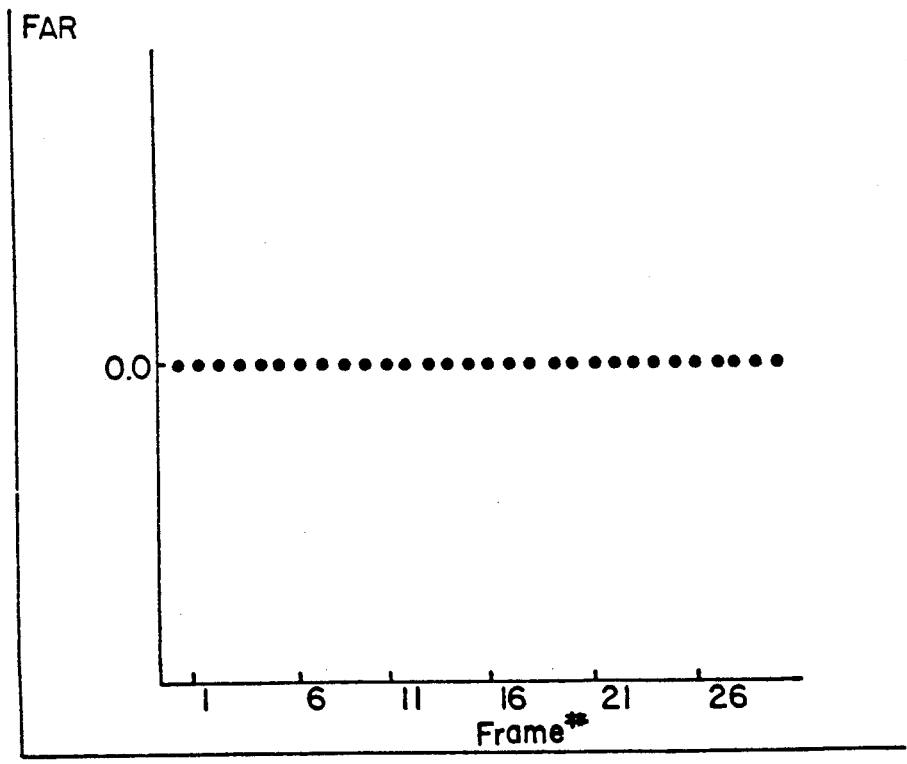
Figures 10, 11:
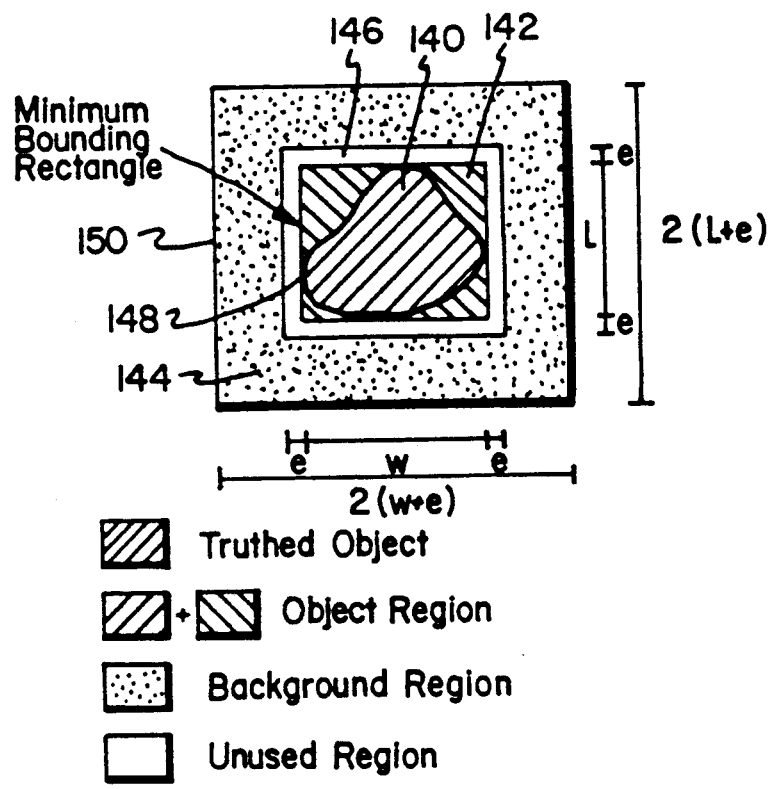
FIG. 10 reveals improvement in segmentation accuracies AOR adaption by the invention.
FIG. 11 shows object and background windows for computing contrast-to-noise ratios.

The final performance results of that experiment are shown in FIGS. 9a and 9b in terms of probability of detection and false alarm rates, respectively. The probability of detection results improved, by almost 200%, as did the FAR, over non-KMBASP 76 results. FIG. 10 shows sample improvements in segmentation accuracy. Column 1 gives the results of segmentation for the AOR without adaption by KMBASP 76 and column 2 gives the results for the AOR with adaption by KMBASP 76.

The results of a number of tests conducted on the KMBASP system indicate that it improves the MTAP performance across multiple scenarios. Furthermore, KMBASP has been revealed to be very fast computationally, and to have a small memory requirement, which makes its real-time implementation a practicality. An expansion in the performance models to higher dimensions impacts the computational speed. For instance, there are currently three performance models used in KMBASP. Each is a seven-dimensional model, whereby a performance measure is a function of three parameters and three metrics. The addition of only 2 additional parameters and 2 metrics will result in three performance models of which each one is of the eleventh dimension. Such models will require about 20% more computational time to optimize.

The performance models were generated as a result of a number of experiments. In one experiment, a set of images was selected from FLIR databases. The image metrics of the selected frames were uniformly distributed. The selected images were processed by the MTAP simulation, through ROI detection, segmentation, and clutter rejection. From the detection and segmentation modules, the three parameters mentioned previously were chosen, mainly due to their performance sensitivities. The three parameters selected to be varied were EDGMIN, OVERSHOOT, and MAXTRGSZ. EDGMIN is the minimum threshold for edge thresholding. This parameter was found to be influential in detection and segmentation performances. OVERSHOOT is the parameter for region-growing segmentation algorithms. MAXTRGSZ is the maximum expected object size in meters. A parameter directly related to this parameter, Window Size, was used, which is its dimensional size in number of pixels that form a minimum of bounding rectangle around the object. This parameter was found to be critical to segmentation performance.

These parameters were selected prior to conducting experiments. The ranges were quantized into three bins. For each image, each parameter was varied three times. Consequently, a total of 3×3×3 runs were made on each image. So, for an experiment conducted on only 10 frames, a total of 270 runs were performed. Window size (MAXTRGSZ) was varied from 30 to 110. Percent overshoot was varied from 3 to 30. EDGMIN was varied from 35 to 70. The performance measures used were $P_D$, FAR and SA. These performance measures were defined as follows:

$$SA = S/G,$$

where S is the segmented region and G is the ground-truth;

$$P_D = \frac{\# \text{ of ROI corresponding to objects}}{\# \text{ of true objects}}; \text{ and}$$

$$FAR = \frac{\# \text{ of ROI not corresponding to true objects in } N \text{ frames}}{N}$$

The image metrics used in the experiments were TIR², ESR and range. Image metrics are measures that quantify various characteristics in the scene. The chosen metrics reflected those qualities that affect MTAP performance.

The metrics used are defined in the following. The "Object Interference Ratio Squared" ($TIR^2$) metric computes a contrast-to-noise ratio using the background intensity variance as an estimate of the noise. FIG. 11 shows boxes or bounding rectangles 148 and 150 outlining the object and the background windows, respectively. Area 140 is the truthed object. Areas 140 and 142 compose the object region. Area 144 is the background region and area 146 is the unused region.

$$TIR^2 = \frac{\left[\frac{1}{N_o}\sum_{i=1}^{N_o} P_{oi} - \frac{1}{N_b}\sum_{u=1}^{N_b} P_{bi}\right]^2}{\frac{1}{N_b}\sum_{i=1}^{N_b} P_{bi}^2 - \left[\frac{1}{N_b}\sum_{i=1}^{N_b} P_{bi}\right]^2} = \frac{(\overline{P_o} - \overline{P_b})^2}{V_b}$$

where:

$X_{oi}$ are pixel intensities within the object region, $N_o$ is the number of pixels in the object region, $X_{bi}$ are the intensities within the background region, and $N_b$ is the number of pixels in the background region.

Figure 12:
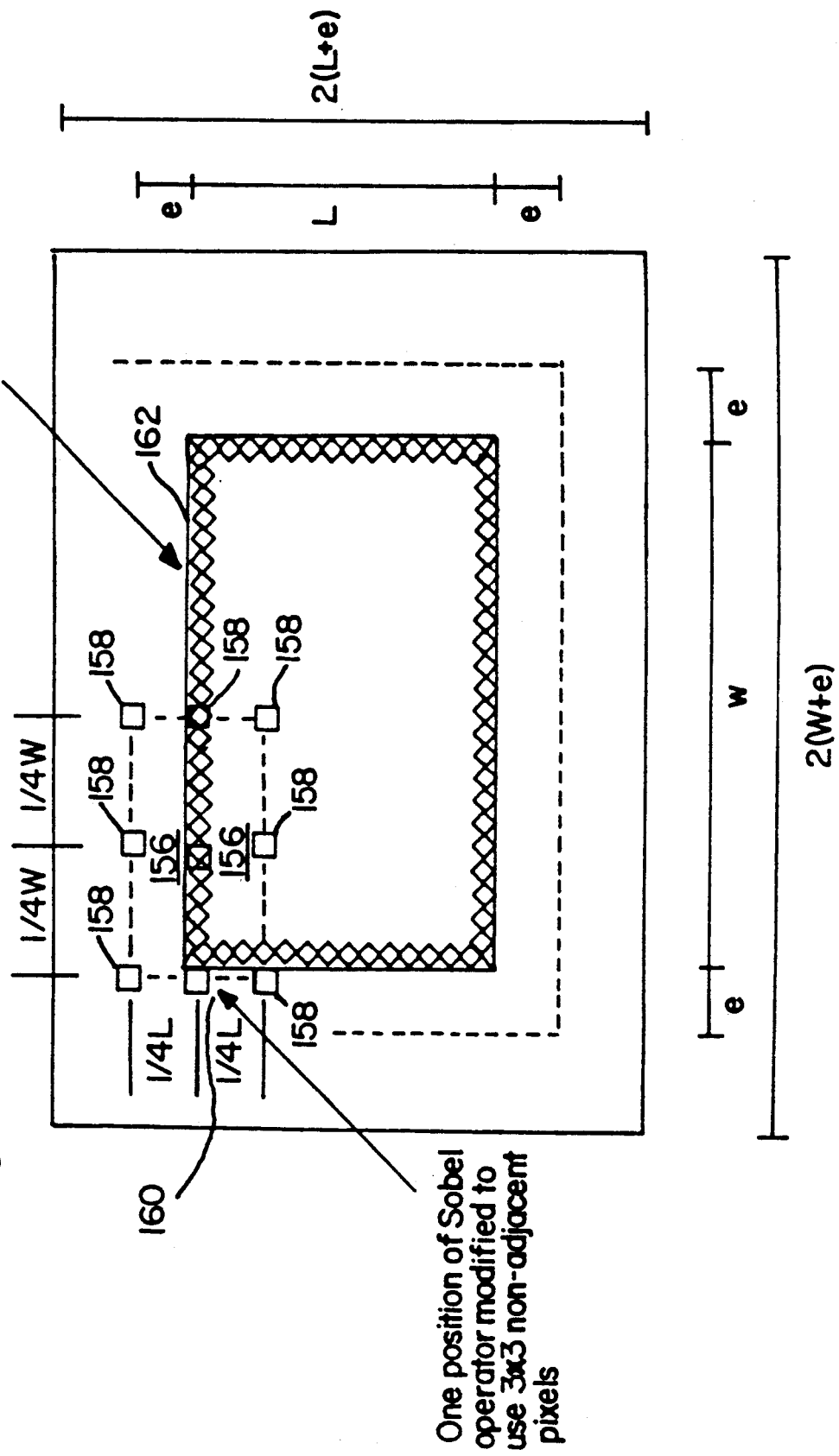
FIG. 12 shows windows for computing image edge strength ratios.

The unused region in FIG. 11 of width "e" is present to remove any contamination of the background computation by object pixels, and vice versa. The "Edge Strength Ratio" (ESR) is computed by taking the mean square of a range-compensated Sobel operator output divided by the local background variance. FIG. 12 shows the windows used in this computation. One position 160 of a Sobel operator is modified to use 3×3 non-adjacent pixels. To compute ESR, modified Sobel window 156 of size ¼ L × ¼ W with 9 non-adjacent pixels 158 is defined. Edge 162 indicates possible Sobel window positions. The Sobel edge values are generated by running this mask in a direction normal to the box edge, around the minimum bound rectangle. ESR is then defined as the mean squared of the Sobel edge values, divided by the variance of pixel intensities in the background region. This latter region is the same as the one in TIR², namely, pixel intensities in the 2(L+e)× 2(W+e) window but not in the (L+n)×(W+e) window. Range is a metric that is the range from the sensor to the center of the field of view.

Once all images have been processed through MTAP, the parameters have been varied, and performance measures results have been collected, performance models can be generated. In other words, the performance measures, the metrics and parameters, and data points are grouped, and a quadratic curve fit is developed. For this purpose, a least square curve-fitting algorithm is implemented. A quadratic polynomial rather than higher order polynomials is used for economic reasons. It would be desirable to try other fits, but previous experience in model generation shows second order surfaces to be adequate. The mean and variance of errors do not change significantly with the use of higher order polynomials.

The performance models were developed to demonstrate the capability of the invention. Based on the collected data points, the generated models for the $P_D$, FAR, and SA, as a function of TIR², ESR, Range, Edge Min, Overshoot and Window Size, are the following:

$$\text{Performance Measure} = A_1 X_1^2 + A_2 X_2^2 + \quad (1)$$
$$A_3 X_3^2 + A_4 X_4^2 + A_5 X_5^2 + A_6 X_6^2 + A_7 X_1 X_2 + A_8 X_1 X_3 +$$
$$A_9 X_1 X_4 + A_{10} X_1 X_5 + A_{11} X_1 X_6 + A_{12} X_2 X_3 + A_{13} X_2 X_4 +$$
$$A_{14} X_2 X_5 + A_{15} X_2 X_6 + A_{16} X_3 X_4 + A_{17} X_3 X_5 + A_{18} X_3 X_6 +$$
$$A_{19} X_4 X_5 + A_{20} X_4 X_6 + A_{21} X_5 X_6 + A_{22} X_1 + A_{23} X_2 +$$
$$A_{24} X_3 + A_{25} X_4 + A_{26} X_5 + A_{27} X_6 + A_{28},$$

where $X_1$ = Range, $X_2$ = ESR, $X_3$ = TIR², $X_4$ = %Overshoot, $X_5$ = Window Size and $X_6$ = Edge Min.

For Probability of Detection, the coefficients are:

| | | | |
|---|---|---|---|
| $A_1 =$ | $2.202904 \times 10^{-5}$ | $A_{15} =$ | $1.075675 \times 10^{-7}$ |
| $A_2 =$ | $-2.763978 \times 10^{-6}$ | $A_{16} =$ | $1.980695 \times 10^{-5}$ |
| $A_3 =$ | $-3.144344 \times 10^{-4}$ | $A_{17} =$ | $-6.827424 \times 10^{-6}$ |
| $A_4 =$ | $-1.960611 \times 10^{-5}$ | $A_{18} =$ | $-1.782892 \times 10^{-6}$ |
| $A_5 =$ | $1.152778 \times 10^{-6}$ | $A_{19} =$ | $-1.052453 \times 10^{-3}$ |
| $A_6 =$ | $-2.046243 \times 10^{-4}$ | $A_{20} =$ | $-3.280481 \times 10^{-7}$ |
| $A_7 =$ | $-4.892870 \times 10^{-6}$ | $A_{21} =$ | $1.643701 \times 10^{-7}$ |
| $A_8 =$ | $9.131467 \times 10^{-6}$ | $A_{22} =$ | $-2.686046 \times 10^{-3}$ |
| $A_9 =$ | $4.665075 \times 10^{-7}$ | $A_{23} =$ | $5.097236 \times 10^{-4}$ |
| $A_{10} =$ | $-3.709367 \times 10^{-6}$ | $A_{24} =$ | $3.680788 \times 10^{-3}$ |
| $A_{11} =$ | $1.633724 \times 10^{-6}$ | $A_{25} =$ | $1.008259 \times 10^{-3}$ |
| $A_{12} =$ | $2.958036 \times 10^{-5}$ | $A_{26} =$ | $6.473176 \times 10^{-4}$ |
| $A_{13} =$ | $-1.684115 \times 10^{-6}$ | $A_{27} =$ | $1.521751 \times 10^{-2}$ |
| $A_{14} =$ | $1.973220 \times 10^{-7}$ | $A_{28} =$ | $-1.173904 \times 10^{-1}$ |

Figure 13B:
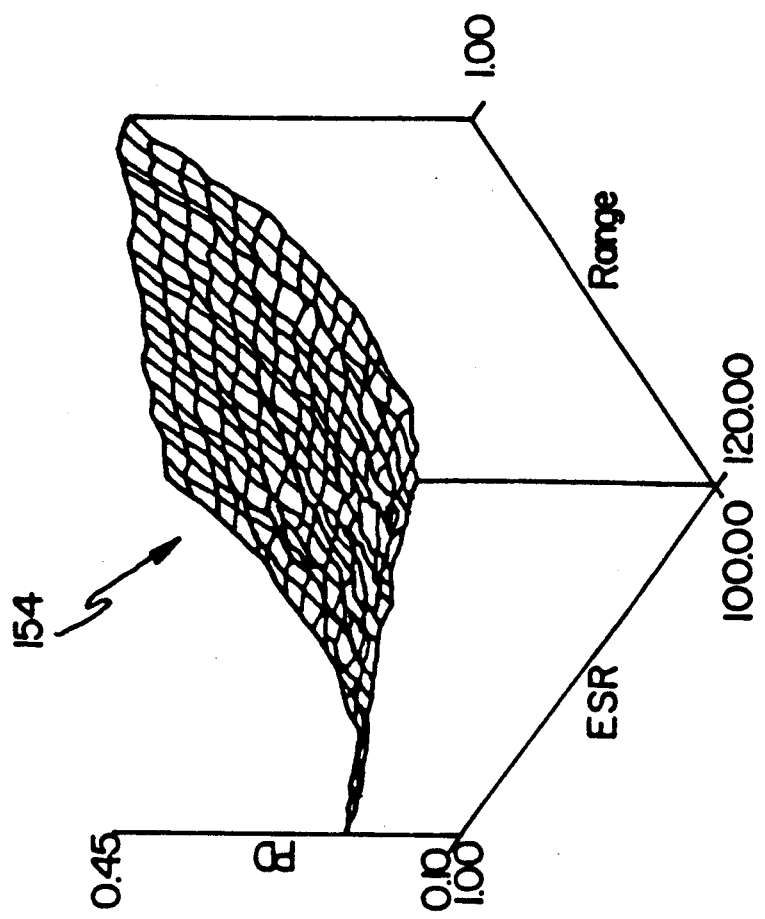
FIGS. 13a and 13b graphical representations of performance models.
Figure 13A:
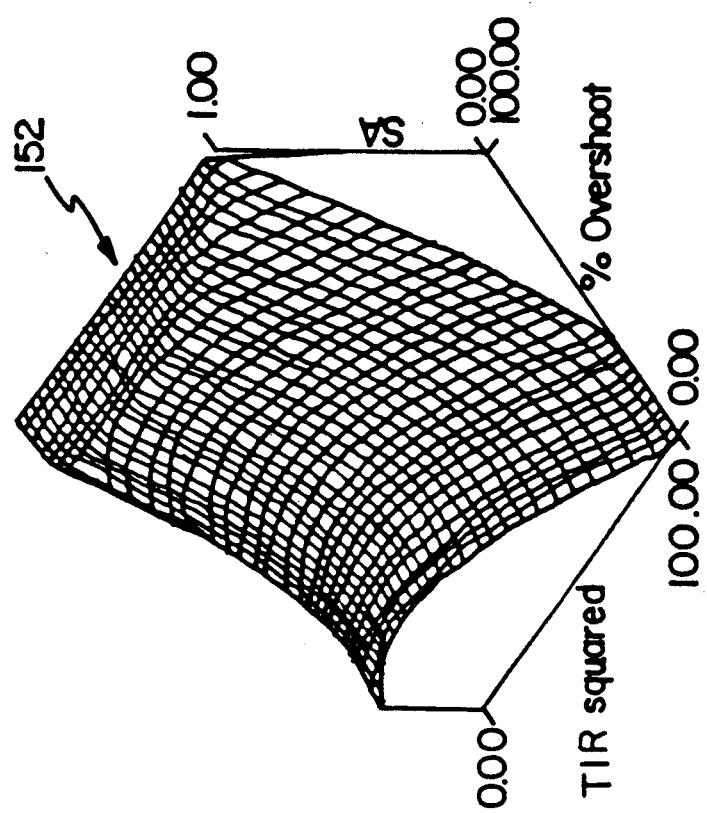

There are two additional sets of 28 coefficients for False Alarm Rate and Segmentation Accuracy. FIG. 13a shows three-dimensional plot 152 of a performance measure vs. metrics and parameters. Plot 152 is a specific example of performance model 20 as noted above. Plot 152 shows variations of segmentation accuracy as a function of TIR² and %Overshoot. For this model, the range was 6 km, ESR = 80, Edge Min = 2 and Window Size = 70. FIG. 13b shows variations plot 154 of $P_D$ vs. ESR and range for model 152, wherein TIR² = 50, %Overshoot = 40, Window Size = 70, and Edge Min = 40.

A stepwise optimization method has been developed for the performance surfaces derived above, which is achieved by obtaining the parameter sets that optimize the performance measures. The optimization technique used has several functions. First, instead of performing optimization for each frame independent of the other frame, the present method considers the changes in metrics from one frame to another and searches for the optimum change in the algorithm parameters instead of determining an original parameter. In this way, the difficult problem of nonlinear, multidimensional optimization with heuristic constraints is avoided. Moreover, by using a stepwise optimization the problem of overshooting the optimum is bypassed. One important point is that optimization in this case is a constraint optimization and mere differentiation of the functionals is not applicable here. Although there are techniques in the field of nonlinear mathematical programming that deal with some cases of non-linear constraint optimization, they usually have restrictive requirements, are time-consuming, and, more significantly, are unable to deal with heuristic constraints. In the present stepwise optimization approach, all of these difficulties are bypassed. This is a fast approach that combines heuristic search methods and mathematical optimization techniques.

The differential of both sides of the above equation (1) is:

$$d(\text{Performance Measure}) = \quad (2)$$
$$dx_1(2A_1x_1 + A_7x_2 + A_8x_3 + A_9x_4 + A_{10}x_5 + A_{11}x_6) +$$
$$dx_2(2A_2x_2 + A_7x_1 + A_{12}x_3 + A_{13}x_4 + A_{14}x_5 + A_{15}x_6) +$$
$$dx_3(2A_3x_3 + A_8x_2 + A_{12}x_2 + A_{16}x_4 + A_{17}x_5 + A_{18}x_6) +$$
$$dx_4(2A_4x_4 + A_9x_1 + A_{13}x_2 + A_{16}x_3 + A_{19}x_5 + A_{20}x_6) +$$
$$dx_5(2A_5x_5 + A_{10}x_1 + A_{14}x_2 + A_{17}x_3 + A_{19}x_4 + A_{21}x_6) +$$
$$dx_6(2A_6x_6 + A_{11}x_1 + A_{15}x_2 + A_{18}x_3 4 + A_{20}x_4 + A_{21}x_5) +$$
$$A_{22} + A_{23} + A_{24} + A_{25} + A_{26} + A_{27}.$$

Then $dx_i$ is obtained such that d(Performance Measure) be as large/small as possible. Moreover, $dx_i$ has to remain within bounds dictated by its range of values and sensitivities. In this optimization, $dx_1$, $dx_2$ and $dx_3$ are of the image metrics and represent metric changes from frame to frame. The result of this mathematical optimization and heuristic constraints is the set of three values, each corresponding to a particular performance measure—$P_D$, FAR and SA.

The baseline invention can be easily integrated with other AOR systems such as sonar and radar objecting systems. The only two requirements for adapting a new system are the development of performance models and the modification of the AOR interface and control software. This invention is applicable to systems having stringent performance, throughput and size requirements.

As an AOR algorithm grows in complexity and sophistication, parameter adaptation becomes less critical. However, until an ideal AOR algorithm (which will embed adaptation) is built, there will be a critical need for adaptation, which will become more critical in algorithms that are not very complex because of hardware throughput constraints. In the latter, the present invention is applicable.

We claim:

1. A knowledge and model based adaptive signal processor comprising:
    model means for providing a plurality of performance models having parameters;
    differential means, connected to said model means, for differentiating each of the performance models;
    change determining means for computing changes in metrics from a previous imagery frame to a current imagery frame;
    optimizing means, connected to said differential means and to said change determining means, for determining and/or adjusting parameters that optimize the performance models; and
    averaging means, connected to said optimizing means, for computing a weighted average of the parameters.

2. Apparatus of claim 1 wherein said model means has performance models which are a function of image metrics wherein the metrics are used by said optimizing means to adjust parameters that optimize the performance models.

3. Apparatus of claim 2 wherein:
    said change determining means is connected to an automated instrumentation and evaluation means;
    said optimizing means is connected to the automated instrumentation and evaluation means;
    said averaging means is connected to the automated instrumentation and evaluation means; and
    the automated instrumentation and evaluation means is connected to an automatic object recognition means.

4. Apparatus of claim 3 wherein:
    each of the performance models has at least one axis representing metric values, an axis representing parameter values and an axis representing performance values; and
    each performance model reveals a parameter value for a given metric value to obtain optimal performance of the automatic object recognition means.

5. Apparatus of claim 4 wherein each performance model indicates a change in the parameter value needed for a next imagery frame of the automatic recognition means, for a given change in the metric value from a current imagery frame to the next frame, to obtain an optimal performance value for obtaining optimal performance of the automatic object recognition means during the next frame.

6. Apparatus of claim 5 wherein said knowledge and model based adaptive signal processor is a Symbolics 3670 computer.

7. Apparatus of claim 5 wherein said knowledge and model based adaptive signal processor is a Sun 3/60 computer.

8. A knowledge and model based adaptive signal processor comprising:
    model means for providing performance models having parameters;
    knowledge means for providing a knowledge base;
    optimizing means, connected to said model means and to said knowledge means, for optimizing the parameters of the performance models;
    inference means, connected to said knowledge means, for inferring a set of parameter adaption rules from said knowledge means; and
    controller means, connected to said inference means and to said optimization means, for activating the set of parameter adaption rules, receiving metrics of images, processing optimized parameters, and providing updated parameters.

9. A knowledge and model based adaptive signal processor comprising:
    algorithm execution means, connected to a scenario and segmentation unit, for executing algorithms, processing images from the scenario and instrumentation unit, and outputting regions of interest to the scenario and segmentation unit;
    computing means, connected to the scenario and segmentation unit, for computing changes in image and object metrics from a previous image to a current image;
    a performance model base;
    a heuristic knowledge base;
    optimizing means, connected to said algorithm execution means, said computing means, said performance model base and said heuristic knowledge base, for differentiating performance models from said from said performance model base, obtaining heuristic search knowledge for reducing search space and achieving rapid convergences toward optimal parameters based on differential performance models, on prior parameters from said algorithm execution means, and on changes in image and object metrics from previous to current images;

update means, connected to said optimizing means, for adding or subtracting a optimized parameter change to or from a previous image parameter setting; and summing means, connected to said algorithm execution means and said heuristic knowledge base, for summing outputs from said heuristic knowledge means and said update means and for outputting updated parameters to said algorithm execution means.

10. Method for knowledge and model based adaptive signal processing, for optimizing performance of an automatic object recognition system, comprising providing a plurality of performance models wherein:

each performance model has at least one axis representing a metric value, an axis representing a parameter value and an axis representing a corresponding performance value;

the performance model reveals the parameter value for a given metric value to obtain optimal performance of the automatic object recognition system; and each performance model indicates a change in parameter value needed for a next imagery frame of the automatic object recognition system, for a given change in metric value between a current imagery frame and a previous imagery frame, to obtain an optimal performance value in order to obtain optimal performance of the automatic object recognition system during the next frame.

11. Method of claim 10 further comprising:

differentiating the plurality of performance models into differential values;

determining metric values from the current frame;

determining metric values from a previous frame;

computing the differences of metric values from the previous frame to the current frame;

obtaining parameter values from the current frame; and optimizing parameter values for the next frame for each of the plurality of performance models, in order to obtain optimal performance values.

12. Method claim 11 further comprising computing a weighted average of parameter values optimized for the next frame, to obtain new parameters for a parameter update to the automatic object recognition system.

* * * * *